(12) United States Patent
Oami

(10) Patent No.: US 6,321,495 B1
(45) Date of Patent: Nov. 27, 2001

(54) WINDOW DEVICE FOR USE IN A MOTOR VEHICLE

(75) Inventor: Kotaro Oami, Aichi-ken (JP)

(73) Assignee: Kabushiki Kaisha Toyoda Jidoshokki, Kariya (JP)

( * ) Notice: Subject to any disclaimer, the term of this patent is extended or adjusted under 35 U.S.C. 154(b) by 0 days.

(21) Appl. No.: 09/649,695

(22) Filed: Aug. 28, 2000

Related U.S. Application Data

(62) Division of application No. 09/129,696, filed on Aug. 5, 1998.

(30) Foreign Application Priority Data

Aug. 7, 1997 (JP) .................................................... 9-213552
Aug. 8, 1997 (JP) .................................................... 9-214782

(51) Int. Cl.[7] ...................................................... E06B 3/00
(52) U.S. Cl. ............................ 52/208; 296/191; 296/216; 428/14
(58) Field of Search ................................ 52/208; 428/14; 296/191, 216; 49/402

(56) References Cited

U.S. PATENT DOCUMENTS

| 5,698,276 | 12/1997 | Mirabitur . |
| 5,702,779 | 12/1997 | Siebelink, Jr. et al. . |

FOREIGN PATENT DOCUMENTS

| 57-29414 | 2/1982 | (JP) . |
| 62-199525 | 9/1987 | (JP) . |
| 62-214011 | 9/1987 | (JP) . |
| 6-106976 | 4/1994 | (JP) . |

*Primary Examiner*—Beth A. Stephan
(74) *Attorney, Agent, or Firm*—Woodcock Washburn LLP

(57) ABSTRACT

A window device for use in a motor vehicle, comprises a resin window panel having at least one pair of rib members protrudingly formed on the inner surface thereof, said pair of rib members being facing each other and each having an outwardly facing tip portion; and a reinforcing member having at least one engaging hole corresponding to the at least one pair of rib members. By inserting and fixing the tip portions of the at least one pair of rib members in the at least one engaging hole of the reinforcing member, the resin window panel and the reinforcing member may be combined together so as to form the window device for use in an automobile.

8 Claims, 7 Drawing Sheets

WINDOW DEVICE FOR USE IN A MOTOR VEHICLE

This Application is a divisional of U.S. provisional application Ser. No. 09/129,696 filed Aug. 5, 1998 (Talw-0036) which is the U.S. filing of Japanese Application Serial No. 9-213552 filed Aug. 7, 1997 and Japanese Application Serial No. 9-214782 filed Aug. 8, 1997.

BACKGROUND OF THE INVENTION

1. Field of the Invention

The present invention relates to a window device for use in a motor vehicle, in particular, to a window device for use as a sunroof in a motor vehicle.

2. Description of the Related Art

For a long time, it has been known that a window device for use as a sunroof in a motor vehicle is made of a polymethyl methacrylate resin or a polycarbonate resin, since this kind of material has only a very small specific gravity and thus it is considered suitable for use as an appropriate material of a light transmissible member for manufacturing a light weight motor vehicle. In a case where a window of a motor vehicle is made of a synthetic resin, since a synthetic resin has a lower elastic modulus than a glass material, the resin material is usually combined with an iron or aluminum reinforcing material along the edge portions of the window so as to obtain a desired reinforcement to prevent a possible bending or twisting.

However, there has been a problem with a window made of a synthetic resin. That is, a resin window panel has a comparatively large deformation amount caused by a thermal expansion due to a temperature change. In fact, such kind of thermal deformation amount is larger than an iron or aluminum material which is usually employed to make a reinforcing member in a window. To cope with the above problem, it has been suggested that a resin window panel be laterally movably combined with reinforcing members which are to be secured on the vehicle main body, so as to form a thermal expansion absorbing structure which is cable of absorbing a thermal expansion caused by a temperature change. This kind of thermal expansion absorbing structure may, for example, be found in Japanese Unexamined Patent Publication No. 62-214011.

FIG. 18 is a cross sectional view indicating the above mentioned thermal expansion absorbing structure disclosed in Japanese Unexamined Patent Publication No. 62-214011. As shown in FIG. 18, tip portions 103 of a plurality of projections 102 located close to the outer edge of a resin window panel 101, are inserted in holes 105 formed through a reinforcing plate member 104, by making use of an elastic deflectable property of the resin material. Further, a sponge rubber 106, which is capable of absorbing a length change caused due to a thermal expansion of the resin window, is interposed into an annular space formed between the outer periphery of each projection 102 and the inner wall of a hole 105.

However, if a sunroof of a motor vehicle is made of a synthetic resin, and if the motor vehicle is running at a high speed, there will be a relatively large detaching force which acts on the resin window panel, resulting in a tendency to cause the resin window panel to leave its original position. In order to avoid such trouble, a combining strength of the resin window panel which is useful in combining itself with a reinforcing member, is required to be large enough to act against the above detaching force.

Nevertheless, a problem with the thermal expansion absorbing structure disclosed in Japanese Unexamined Patent Publication No. 62-214011 may be concluded as follows. Namely, since the tip portions 103 of the projections 102 of a resin window panel 101 are inserted in the holes 105 of a reinforcing plate member 104 by making use of an elastic deflectable property of the resin material, a comparatively large inserting force is needed to effect such an insertion if an engaging amount for the combination of the two (the projection 102 and the hole 105) is large. Moreover, if a large force is used to act as an inserting force, there will occur a crack or breaking in the tip portions 103 of the projections 102.

SUMMARY OF THE INVENTION

In view of the above discussed problems associated with the above mentioned prior arts, it is an object of the present invention to provide an improved window device for use in a motor vehicle, in which an inserting force for inserting protruded engaging members into corresponding engaging holes is allowed to be greatly reduced on one hand, and a detaching force tending to cause a resin window panel to leave its original installation position may be overcome on the other.

According to a first aspect of the present invention, there is provided a window device for use in a motor vehicle, comprising: a resin window panel having at least one pair of rib members protrudingly formed on the inner surface thereof, said pair of rib members being facing each other with each having an outwardly facing tip portion; and a reinforcing member having at least one engaging hole corresponding to the at least one pair of rib members. The resin window panel and the reinforcing member may be combined with each other by inserting tip portions of the at least one pair of rib members into the at least one engaging hole of the reinforcing member.

According to a second aspect of the present invention, there is further provided another window device for use in a motor vehicle, comprising: a reinforcing member having at least one engaging hole; a resin window panel having at least one protruded engaging portion formed on its inner surface for freely inserting into a corresponding engaging hole of the reinforcing member, and an insertion amount restricting portion which is adapted to engage on the reinforcing member so as to restrict an insertion amount of the above protruded engaging portion; and an engaging head formed by calk-treating the front end of the above protruded engaging portion after being inserted in an engaging hole, said engaging head being adapted to retain a metal piece on the edge of the engaging hole.

DESCRIPTION OF THE PREFERRED EMBODIMENTS

Embodiment 1

A first embodiment of the present invention will be described with reference to FIGS. 1–4.

Figure 1:
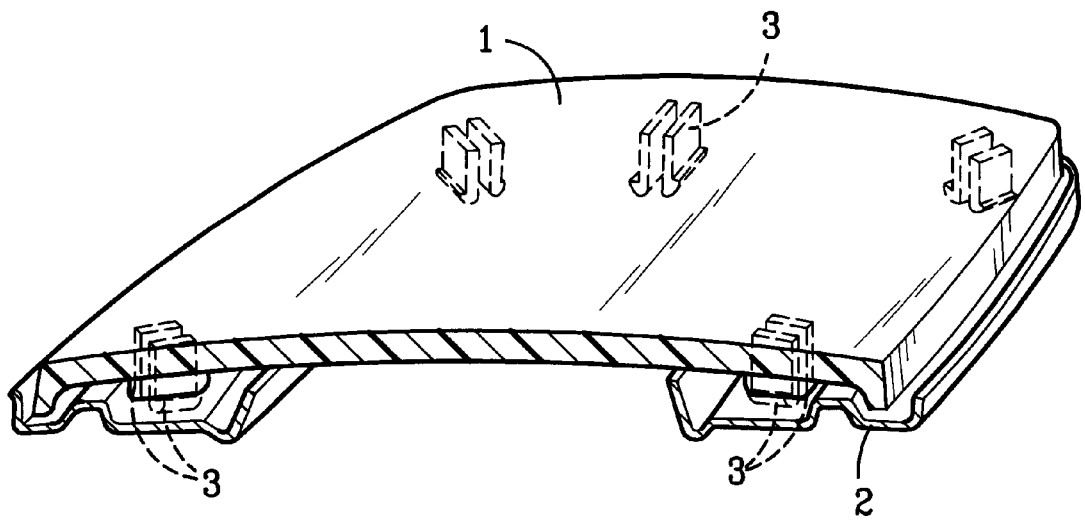
FIGS. 1 and 2 are a perspective sectional view and a bottom view illustrating an automobile window device according to a first embodiment of the present invention, respectively.
Figure 2:
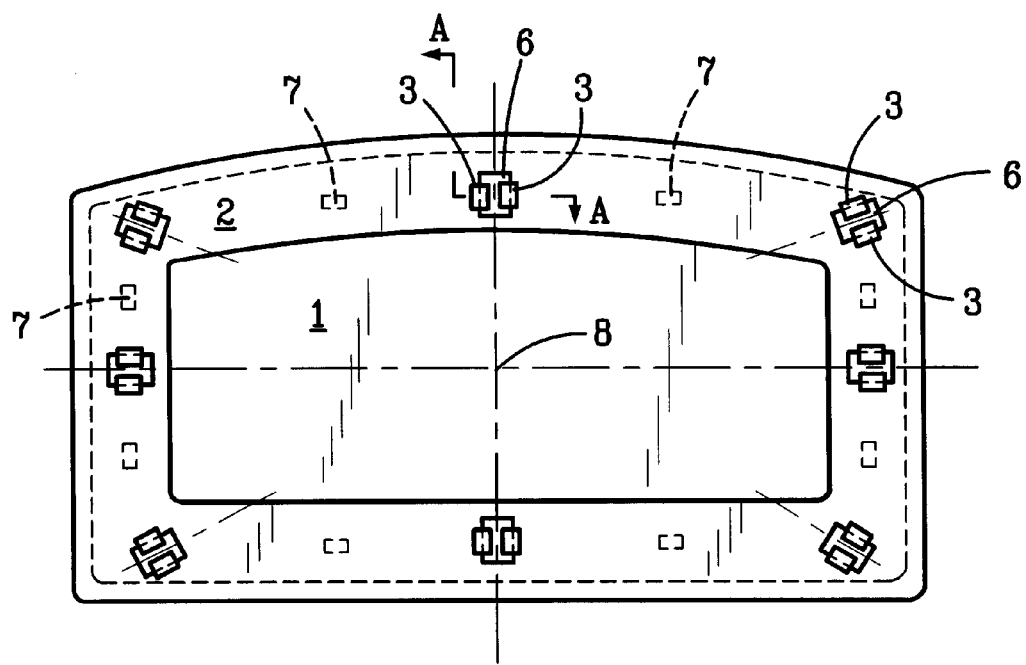

The present invention may be applied to a window device serving as a sunroof in a motor vehicle. Referring to FIGS. 1 and 2, a resin window panel 1 is formed into a rectangular shape with its longitudinal axis arranged in a lateral direction of the vehicle. A reinforcing member 2, which is made of an iron material and formed into a square frame structure, is arranged on the inner surface of the resin window panel 1 adjacent to the outer edge thereof. With the use of the reinforcing member 2, the resin window panel 1 is sufficiently reinforced so that a possible bending or twisting of the resin window panel 1 may be prevented or at least prohibited.

Referring again to FIGS. 1 and 2, the resin window panel 1 and the reinforcing member 2 are mutually combined together, through several connection spots (for example, eight) arranged at an appropriate interval on the reinforcing member 2. The reinforcing member 2 itself is connected to the main body of a motor vehicle (not shown). Where the resin window panel 1 is a sunroof, the reinforcing member 2 is required to be made such that its cross section has a sectional secondary moment (geometrical moment of inertia) which is useful to resist a detaching force acting upon the reinforcing member 2 while the motor vehicle is running at a high speed.

Figure 3:
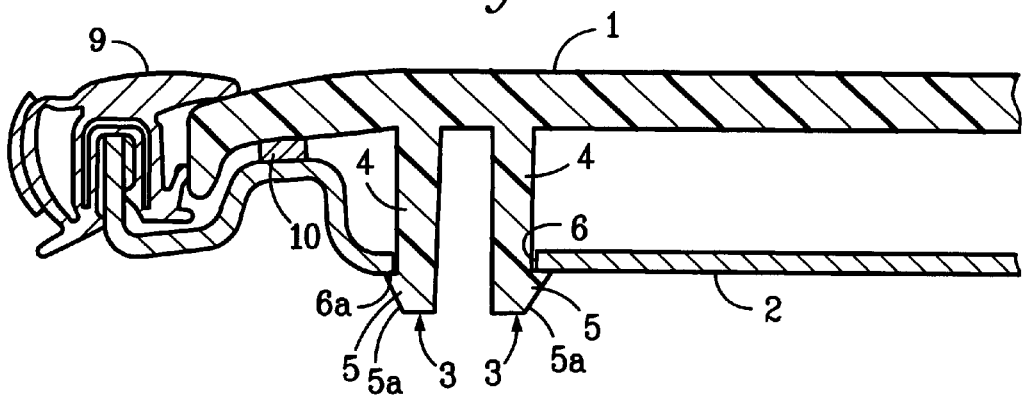
FIG. 3 is a cross sectional view taken along a line A—A in FIG. 2.

A structure for connecting the resin window panel 1 with the reinforcing member 2 may be understood with reference to FIG. 3. Referring to FIG. 3, each connection spot for connecting the reinforcing member 2 with the resin window panel 1, is located on the inner surface of the resin window panel 1 close to the outer edge thereof. In detail, each connection spot includes a pair of mutually parallel rib members 3, 3, both of which are formed integrally with the resin window panel 1. Each rib member 3 comprises a rib main body 4 having a tip portion 5.

On the other hand, the reinforcing member 2 is formed with a plurality of engaging holes 6 each having a rectangular cross section. The tip portions 5, 5 of each pair of rib members 3, 3 may be easily inserted into an engaging hole 6, by making use of an elastic deflectable property of the resin rib members 3, 3. In this way, the tip portions 5, 5 may be easily engaged into the hole 6, thereby enabling the resin window panel 1 and the reinforcing member 2 to be exactly combined together. At this time, since each rib member 3 has its tip portion 5 formed to have a tapered surface 5a, the insertion of the tip portion 5 into the hole 6 is easy.

Figure 4:
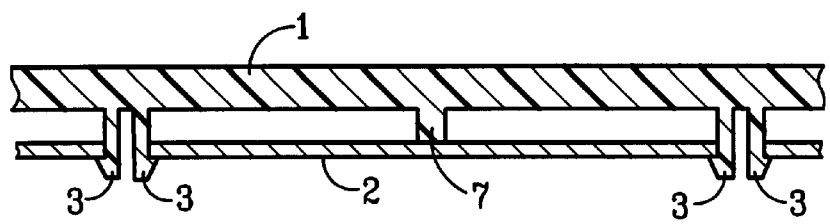
FIG. 4 is a sectional view indicating a resin window panel and its reinforcing member taken along an edge portion of the automobile window device.

Referring to FIG. 4, between every two connection spots on the inner surface of the resin window panel 1, there is a rib 7 formed integrally with the resin window panel 1. This rib 7 is used as a stopper capable of engaging on the inner surface of the reinforcing member 2, so that when a pair of the rib members 3, 3 are being inserted through the hole 6, such an insertion movement may be restricted, ensuring that the rib members 3, 3 are inserted to a predetermined extent in the hole 6. In this manner, the reinforcing member 2 is clamped on both sides thereof by the ribs 7 on one hand and by the tip portions 5 on the other, without any rattling between the resin window panel 1 and the reinforcing member 2.

Referring again to FIG. 2, each engaging hole 6 is in a rectangular shape having its longitudinal direction orthogonal to an engaging direction of each tip portion 5 of each rib member 3, so that a pair of rib members 3, 3 are slidable in the longitudinal direction of the hole 6, while still maintaining a desired engagement between the resin window panel 1 and the reinforcing member 2.

Further, as is understood in FIG. 2, each engaging hole 6 is orientated in a manner such that a sliding direction of each rib member 3, which is also the longitudinal direction of each engaging hole 6, is directed to a center point 8 of the resin window panel 1. In more detail, the engaging holes 6 are located on upper, lower, left and right edge portions of the resin window panel 1, and the longitudinal direction of each hole 6 is coincident with a radial direction of the center point 8.

In FIG. 3, a reference numeral 9 is a weather strip fixed over the entire outer edge of the resin window panel 1, while a reference numeral 10 is a sealing member interposed between the resin window panel 1 the reinforcing member 2.

In this way, after the rib members 3 of the resin window 1 have been inserted into the holes 6 of the reinforcing member 2, the tip portion 5 of each rib member 3 will be engaged in an engaging hole 6, so that the reinforcing member 2 may be exactly combined to the resin window panel 1 in a predetermined manner.

In this first embodiment of the present invention, since each connection spot for connecting the resin window panel 1 with the reinforcing member 2 has a pair of rib members 3, 3, and since the pair of rib members 3, 3 may be easily inserted into an engaging hole 6 by making use of the elastic deflectable property of the resin rib members 3, 3 including rib main bodies 4, 4, an inserting force necessary for inserting the rib members 3, 3 into the engaging holes 6 is allowed to be greatly reduced, thereby rendering an assembling operation to be accomplished in a simple way.

Further, since an inserting force necessary for inserting the rib members 3, 3 into the engaging holes 6 is allowed to be greatly reduced, an engaging amount for engaging the rib members 3, 3 with an edge portion 6a surrounding the hole 6 is allowed to be made large, thus ensuring a sufficiently fixed engagement which is useful for preventing the reinforcing member 2 from accidentally leaving the resin window panel 1.

Moreover, since the rib members 3, 3 are slidable in the engaging holes 6 in the longitudinal directions thereof, when the resin window panel 1 is thermally expanded due to a temperature change, all of the rib members 3, 3 formed on the inner surface of the resin window panel 1 will simultaneously slide in a radial direction of the center point 8, so that the thermal expansion of the resin window panel 1 may be effectively absorbed, preventing a possible thermal deformation of the resin window panel 1.

Although in the first embodiment each engaging hole 6 is formed into a rectangular shape, it is also possible that each engaging hole 6 may be formed into a long and narrow elongate hole with their two shorter edges being formed into two half-circles. In addition, it is also allowable that each pair of rib members 3, 3 may be made into any optional shapes as long as there are formed two mutually parallel long edge portions.

Embodiment 2

A second embodiment of the present invention will be described with reference to FIG. 5.

The second embodiment is almost the same as the first embodiment except the following differences.

Figure 5:
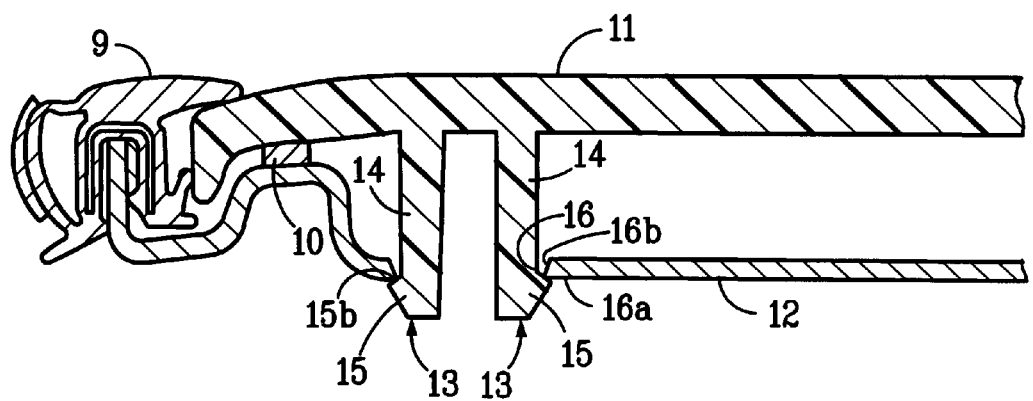
FIG. 5 is a partial sectional view illustrating an automobile window device according to a second embodiment of the present invention.

Namely, referring to FIG. 5, in order to enable a pair of rib members 13, 13 to be more easily inserted into an engaging hole 16, a tapered edge surface 16b is formed above an edge portion 16a of each engaging hole 16 on a reinforce member 12. On the other hand, in order to increase a strength for the rib members 13, 13, a tapered surface 15b is formed on the tip portion 15 of each rib member 13, in a manner such that the tapered surface 15b forms an obtuse angle with the vertical wall of the rib main body 14.

In this way, with the use of the window device made according to the second embodiment of the present invention, when the tip portions 15 of the pair of rib members 13, 13 are inserted through an engaging hole 16, the tip portions 15 may be easily inserted therethrough without any difficulty, owing to the tapered edge surface 16b formed on the engaging hole 16. Accordingly, an insertion force necessary for inserting a pair of the rib members 13, 13 into engaging holes 16 is allowed to be greatly reduced.

After the reinforcing member 2 has been combined with the resin window panel 1 in the above described engagement, since the engaging surface 15b of the tip portion 15 of each rib member 13 is tapered so as to avoid the formation of a sharp edge (such as that indicated by reference numeral 5 in FIG. 3), a possible stress concentration may be avoided, thereby obtaining an effect of preventing a possible crack or breaking in the tip portion 15.

Embodiment 3

A third embodiment of the present invention will be described with reference to FIG. 6.

The third embodiment is almost the same as any one of the previous embodiments except the following differences.

Figure 6:
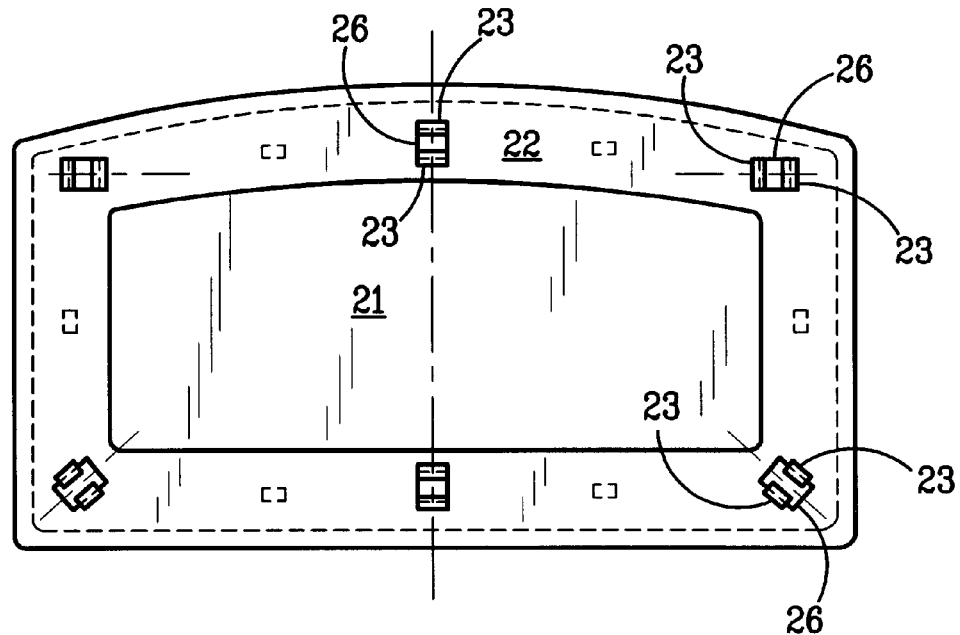
FIGS. 6 and 7 are bottom views illustrating automobile window devices according to a third and a fourth embodiments of the present invention, respectively.

Namely, referring to FIG. 6, a thermal expansion of a resin window panel 21 may be absorbed by a sliding movement of rib members 23 and by an effect of an elastic deflectable property of a resin material forming the resin window panel 21. A difference between the third embodiment and any one of the previous embodiments is that there are six connection spots for connecting a reinforcing member 22 with the resin window 21, and one of the six connection spots (for example, the middle one on the upper side shown in FIG. 6) has been made not slidable. In detail, a pair of rib members 23, 23 are engaged in an engaging hole 26 in a manner such that they can not move in the hole 26 in the longitudinal direction thereof, whilst other pairs of rib members 23 at other connection spots (the remaining two spots on the upper side and the middle one on the lower side in FIG. 6) are arranged such that their deflectable directions are towards the above non-slidable point.

Accordingly, in the third embodiment, when the resin window panel 1 is thermally expanded, thermal expansions happening around the left and right connection spots on the upper side and another thermal expansion happening around the middle connection spot on the lower side, are relatively small and may be absorbed by an effect of elastic deflection of the rib members 23. On the other hand, thermal expansions around the left and right connection spots on the lower side of the resin window panel 21 shown in FIG. 6 are relatively large and may be absorbed by the sliding movement of the rib members 3 in the longitudinal direction of the engaging holes 26. Therefore, a deflecting deformation of the resin window panel 21, which is possibly caused due to a temperature change, may be exactly prevented. In this way, by making use of the elastic deflectable property of the rib members 23, it is possible to reduce the connection spots where relatively large engaging holes are needed in order that rib members can slide in the engaging holes in the longitudinal directions thereof, thereby ensuring a sufficient strength for the reinforcing member 22.

Embodiment 4

A fourth embodiment of the present invention will be described with reference to FIG. 7.

Figure 7:
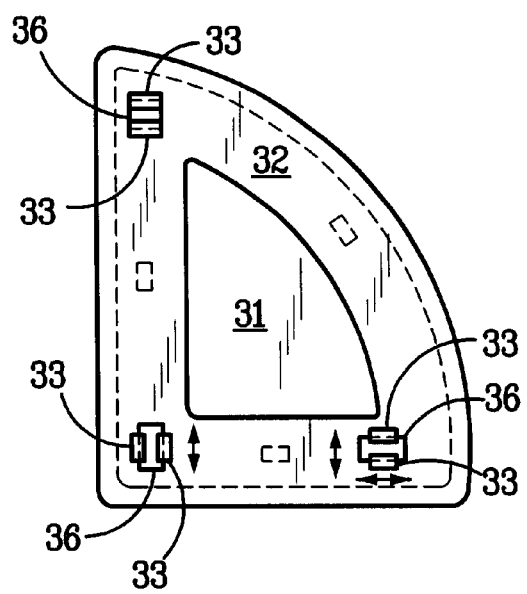

Referring to FIG. 7, a rear quarter window having a generally triangular shape is used in a motor vehicle. As shown in FIG. 7, there are three connection spots which are respectively located in three corners of the triangular shape for connecting a reinforcing member 32 with a resin window panel 31. In particular, one connection spot (for example, the one at the upper left corner) is made not slidable (i.e., each pair of rib members are not slidable in a corresponding engaging hole in the longitudinal direction thereof). A connection spot on the lower left corner is made slidable in a vertical direction in the drawing, whilst a connection spot on the lower right corner is made not slidable in a back and forth direction.

With the use of the structure made according to the fourth embodiment of the present invention, a thermal expansion happening around the lower left corner may be absorbed by the sliding movement of the rib members 33 in the longitudinal direction of engaging holes 36, whereas another thermal expansion happening around the lower right corner may be absorbed by an effect of elastic deflectable property of the resin rib members 33. Therefore, a deflecting deformation of the resin window panel 31, which is possibly caused due to a temperature change, may be exactly prevented.

Embodiment 5

A fifth embodiment of the present invention will be described with reference to FIGS. 8 and 9.

Figure 8:
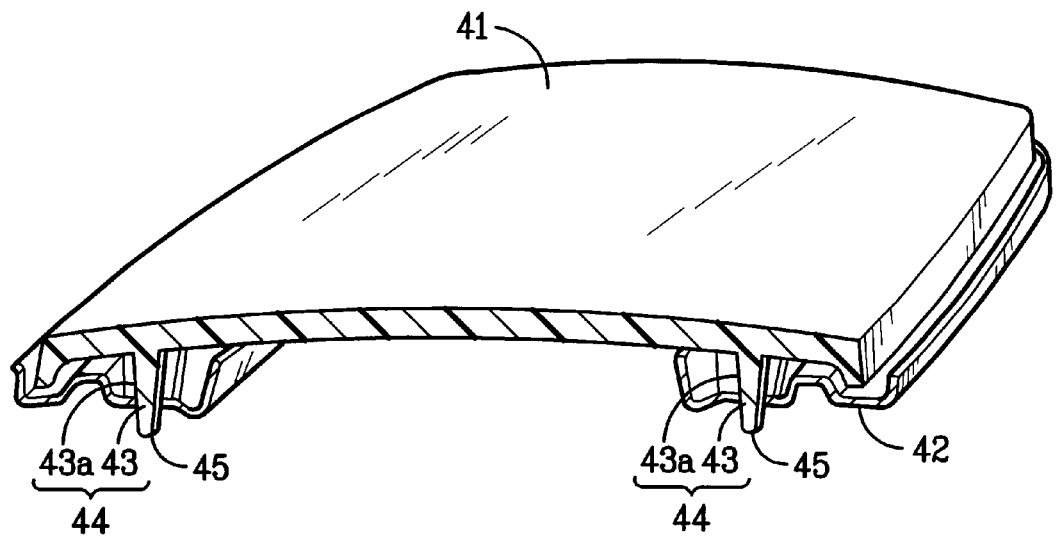
FIGS. 8 and 9 are a perspective sectional view and a bottom view illustrating an automobile window device according to a fifth embodiment of the present invention, respectively.
Figure 9:
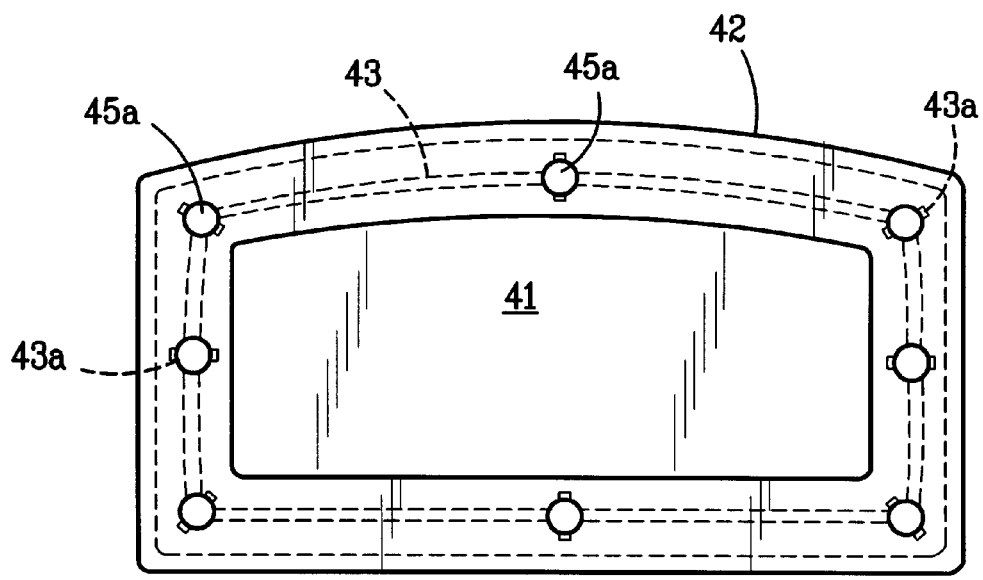

Referring to FIGS. 8 and 9, a resin window panel 41 is formed into a rectangular shape, which is reinforced by a reinforcing member 42 made of an iron or an aluminum material. In detail, the reinforcing member 42 is formed in to a rectangular frame structure which is arranged on the inner surface of the resin window panel 41 adjacent to its entire outer edge. In this way, a desired rigidity may be obtained for the resin window panel 41, so that a possible bending or deflection of the resin window panel 41 may be exactly prevented.

Similar to the above first embodiment, the resin window panel 41 and the reinforcing member 42 are mutually combined together, through several connection spots (for example, eight) arranged at an appropriate interval on the reinforcing member 42. The reinforcing member 42 itself is connected with the main body of a motor vehicle (not shown). Where the resin window panel 41 is a sunroof, the reinforcing member 42 is required to be made such that its cross section has a sectional secondary moment (geometrical moment of inertia) which is useful to resist a detaching force acting on the reinforcing member 42 while the motor vehicle is running at a high speed.

Figure 10:
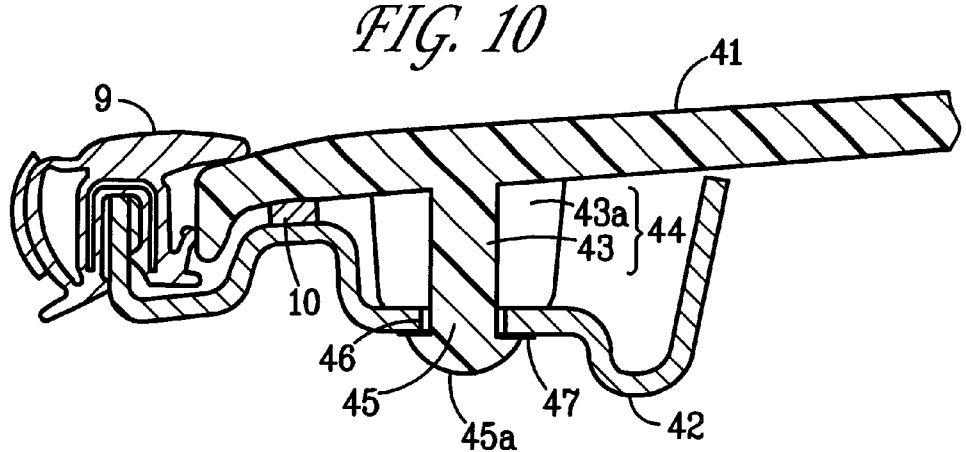
FIGS. 10 and 11 are partial sectional views illustrating the automobile window device of the fifth embodiment in its condition after a calking treatment and in its condition before a calking treatment, respectively.
Figure 11:
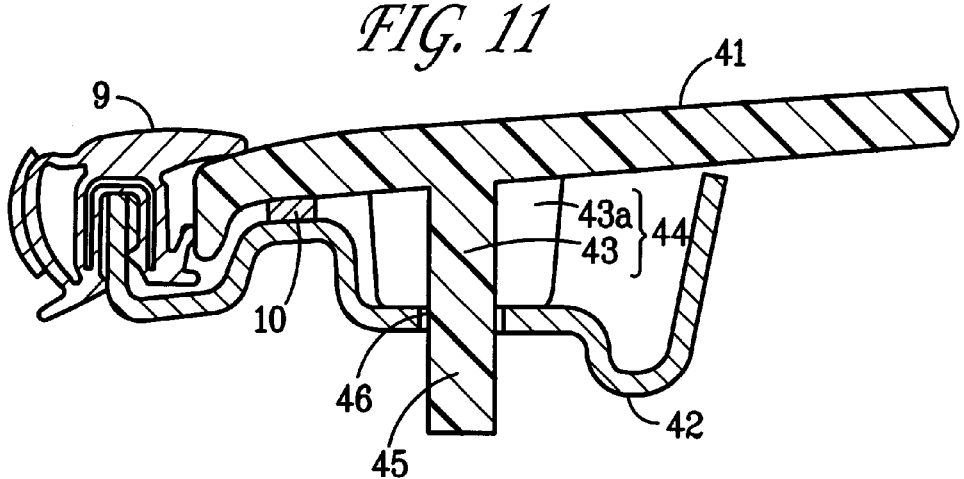

A combining structure for connecting the reinforcing member 42 with the resin window panel 41, may be understood with reference to FIGS. 10 and 11. As shown in FIGS. 10 and 11, each reinforcing rib member 43 is formed integrally with the inner surface of the resin window panel 41 adjacent to its outer edge. Further, each rib member 43 is integrally formed with an auxiliary rib member 43a in a manner such that a cross rib assembly 44 is obtained.

As shown in FIG. 11, a solid cylindrical boss portion 45 having a predetermined length is integrally formed with the cross rib assembly 44. Such a solid cylindrical boss portion 45 is so formed that it may be freely inserted through an engaging hole 46 formed on the reinforcing member 42. In practice, the cylindrical boss portion 45 is inserted through the hole 46 until the end face of the cross rib assembly 44 get in contact with the reinforcing member 42. In this way, an insertion amount of the cross rib assembly 44 when inserting into the engaging hole 46 may be properly restricted.

After the solid cylindrical boss portion 45 is inserted in the engaging hole 46 and a metal piece 47 is attached around the boss portion 45 on the underside of the reinforcing member 42, a calking treatment is performed on the solid cylindrical boss portion 45 so as to form a hemispherical head 45a (FIG. 10). In this manner, the circular edge portion of the engaging hole 46 of the reinforcing member 42 is tightly interposed between the end face of the cross rib assembly 44 and the engaging face of the hemispherical head 45a, thereby combining together the resin window panel 41 and the reinforcing member 42. With the use of this structure, since there is an annular clearance formed between the outer surface of the solid cylindrical boss portion 45 and the inner wall of the engaging hole 46, a thermal expansion of the resin window panel 41 may be sufficiently absorbed without causing any deformation.

Further, with regard to the structure of the fifth embodiment of the present invention, the hemispherical head 45a formed by calking treatment, is possible to be made into any allowable size by setting a sufficient length for the solid cylindrical boss portion 45 protruding from the end face of the cross rib assembly 44. Therefore, by increasing an engaging amount of each hemispherical head 45a with the edge portion of a corresponding engaging hole 46, it is sure to obtain a sufficient combining strength enough to resist an undesired detaching force acting on the reinforcing member 42 when a motor vehicle is running at a high speed.

On the other hand, if a calking treatment of the solid cylindrical boss portion 45 is performed under the reinforcing member 42, there will be a possibility that a melt resin will get into an annular clearance formed between the outer surface of the solid cylindrical boss portion 45 and the inner wall of the engaging hole 46. In order to avoid such trouble, in accordance with the present embodiment, a possible flow of a melt resin may be stopped by the metal piece 47 (see FIG. 10), thereby ensuring a reliable effect of absorbing a thermal expansion of the resin window panel 41.

Moreover, with the use of the metal piece 47, since the diameter of the metal piece 47 may be set larger than that of the hemispherical head 45a, an actual engaging area of the hemispherical head 45a may become considerably large, thereby enabling the strength of the hemispherical head 45a to be further increased.

In addition, since the solid cylindrical boss portion 45 is formed protruding from the center of the cross rib assembly 44 so that the rib assembly 44 surrounds the connection spot, it is sure to form a balanced engagement of the resin window 41 with the reinforcing member 42. Therefore, a relative movement of the resin window panel 41 (caused due to a thermal expansion) with respect to the reinforcing member 42 may be made more stable, thus effectively avoiding a rattling.

Embodiment 6

A sixth embodiment of the present invention will be described with reference to FIG. 12.

The sixth embodiment is almost the same as the fifth embodiment except the following difference.

Figure 12:
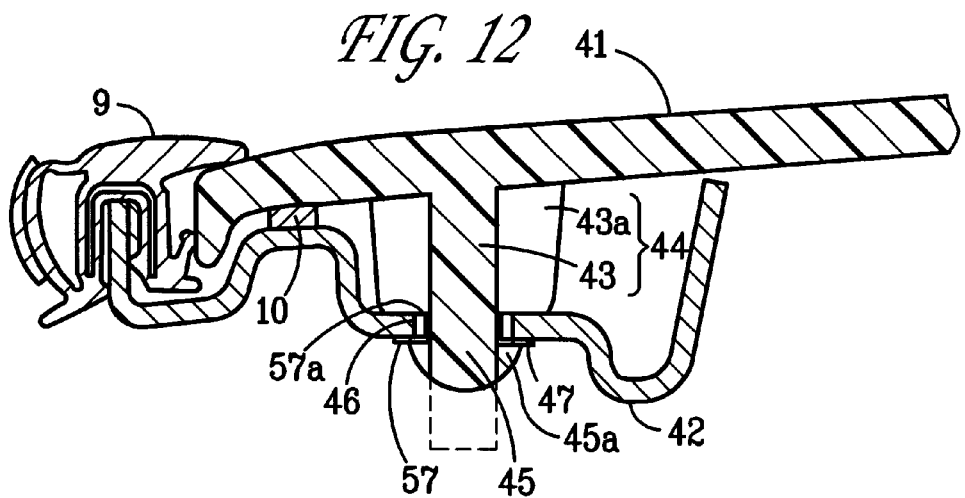
FIGS. 12 to 15 are partial sectional views illustrating automobile window devices according to sixth to ninth embodiments of the present invention, respectively.

Namely, referring to FIG. 12, a cylindrical portion 57a is freely inserted in an engaging hole 46 and it is held on a metal piece 57 such that it may get into an engagement with the end face of a cross rib assembly 44.

With the use of the structure made according to the sixth embodiment of the present invention, it is possible not only to obtain some effects which are the same as those obtainable in the above fifth embodiment, but also to offer a further effect which will be explained in the following. Namely, after a solid boss portion 45 is inserted into an engaging hole 46 formed on a reinforcing member 42, a hemispherical head 45a is formed by means of calking treatment (in FIG. 12, a contour indicated by a virtual line represents a condition prior to the calking treatment), producing an annular clearance having a uniform height between the metal piece 57 and the cross rib assembly 44 by the cylindrical portion 57a. In this way, if a height of the annular clearance between the metal piece 57 and the cross rib assembly 44 is set to be larger to some extent than the thickness of the reinforcing member 42, it is possible to obtain an improved smoothness for a relative movement of the resin window panel 41 (caused due to a thermal expansion) with respect to the reinforcing member 42. Further, with the use of the cylindrical portion 57a, it may be made sure for the boss portion 45 not to touch the inner edge (wall) of the engaging hole 46, thereby avoiding a possible damage to the engaging hole 46.

Embodiments 7 and 8

A seventh embodiment of the present invention will be described with reference to FIG. 13, while an eighth embodiment of the present invention will be described with reference to FIG. 14.

Figure 13:
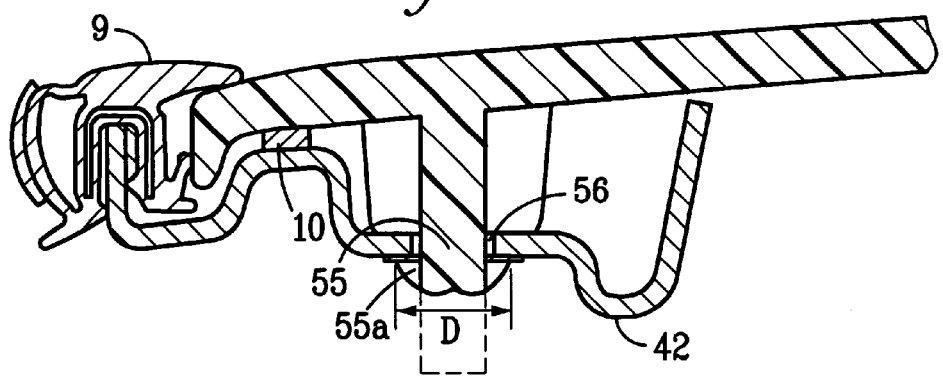
Figure 14:
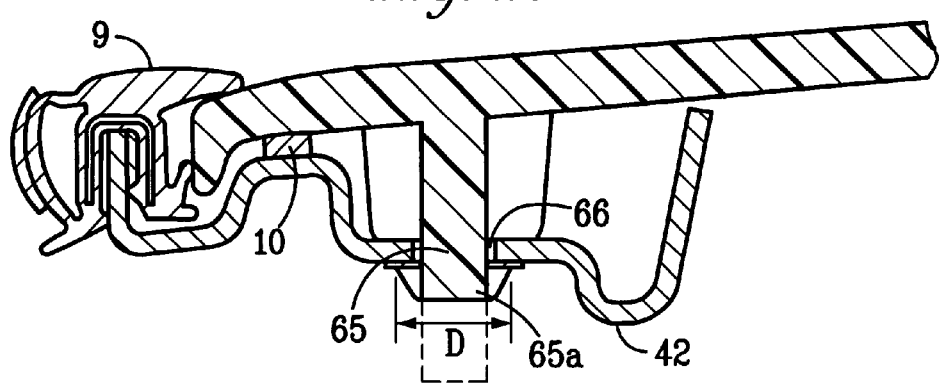

As shown in FIGS. 13 and 14, in the seventh and eighth embodiments, engaging heads 55a and 65a are formed respectively on the front ends of boss portions 55 and 65, by means of calking treatment (in FIGS. 13 and 14, contours indicated by virtual lines represent conditions prior to the calking treatment). In the seventh embodiment shown in FIG. 13, the engaging head 55a is formed into a generally two-leaf shape when viewed on its cross section. In the eighth embodiment shown in FIG. 14, the engaging head 65a is formed into a generally trapezoidal shape when viewed on its cross section.

Each of the seventh and eighth embodiments will provide an effect which is the same as that obtainable in the fifth embodiment. Further, in the seventh and eighth embodiments, although each of the engaging heads 55a and 65a has only the same volume as the engaging head 45a in the fifth embodiment, both of the engaging heads 55a and 65a are able to provide larger areas (than the engaging head 45a in the fifth embodiment) for engaging with the edge portions of engaging holes 56 and 66. Therefore, a strength for combining a reinforcing member with a resin window panel may be further increased as compared with the fifth embodiment. Moreover, with the use of the seventh and eighth embodiments, if an amount of a thermal expansion of a resin window panel is relatively large, the engaging holes 56 and 66 are allowed to be made large so as to absorb a large movement of the resin window panel which is caused by a large amount of thermal expansion.

Embodiment 9

A ninth embodiment of the present invention will be described with reference to FIG. 15.

Figure 15:
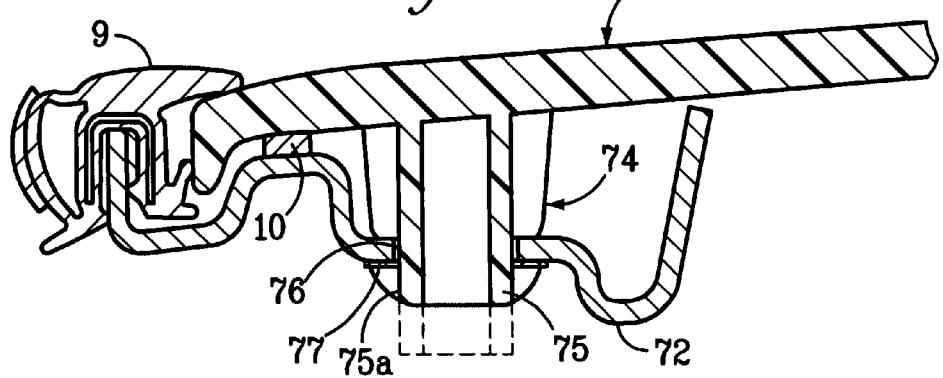

As shown in FIG. 15, a plurality of bosses 75 each having a hollow cylindrical structure are formed integrally on the inner surface of a resin window panel 71. After each boss 75 is inserted into an engaging hole 76 of a reinforcing member 72, a metal piece 77 is attached to the end face of the boss 75. Then, calking treatment is performed so that a flange head 75a is formed around the engaging hole 76 (in FIG. 15, a contour indicated by a virtual line represents a condition prior to the calking treatment). In this way, the circular edge portion of the engaging hole 76 of the reinforcing member 72 is tightly clamped between the end face of a cross rib assembly 74 and an engaging face of the flange head 75a, thereby combining together the resin window panel 71 and the reinforcing member 72.

With the use of the structure made according to the ninth embodiment of the present invention, not only is it possible to obtain some effects which are the same as those obtainable in the fifth embodiment, but would also provide a further effect which is useful when the engaging hole 76 is needed to be large. Namely, in general, if a plurality of solid boss portions are formed integrally with the resin window panel 71, and if the diameter of each boss portion 75 is relatively large with respect to an engaging hole, there will occur a "pulling" (facing the center of each boss) on the outer surface of the resin window panel 71 in cooling. However, with the use of the ninth embodiment of the present invention, the hollow cylindrical boss 75 is useful to avoid the "pulling" phenomenon, thereby permitting a large size for each connection point for connecting the reinforcing member 72 with the resin window panel 71. In addition, the hollow cylindrical structure according to the ninth embodiment is also useful in reducing the amount of necessary material for forming the bosses 75 and the cross rib assembly 74, thus lowering the manufacturing cost.

Figure 16:
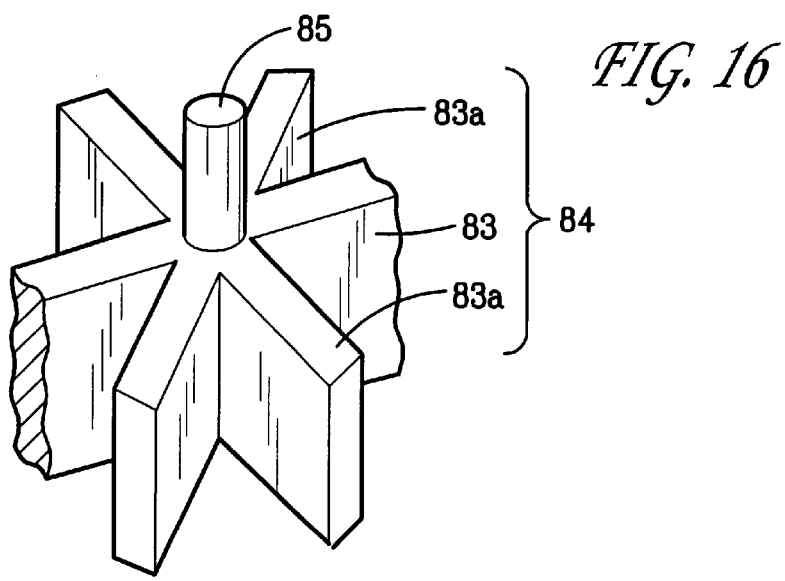
FIGS. 16 and 17 are perspective views illustrating modified rib assemblies used in a window device of the present invention, respectively.

Although in the fifth to ninth embodiments it has been described that the cross rib assemblies 44 and 74 are useful for restricting an insertion movement of a boss portion when being inserted through an engaging hole, it is also possible to employ a structure shown in FIG. 16 for the same purpose. As shown in FIG. 16, a reinforcing rib member 83 and a cross rib 83a together form a star-like rib assembly 84. Further, a boss 85 is formed on the end face of the star-like rib assembly 84.

Figure 17:
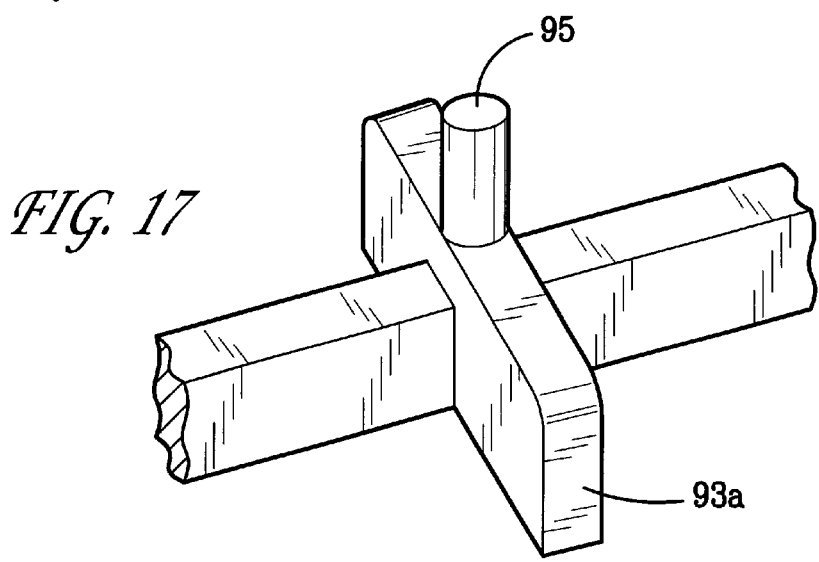
Figure 18:
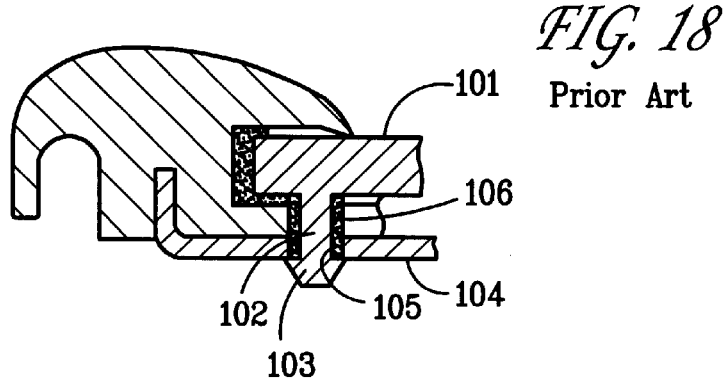
FIG. 18 is a cross sectional view illustrating a thermal expansion absorbing structure used in a conventional window device.

In addition, it is also possible to utilize a structure shown in FIG. 17. As shown in FIG. 17, a cross rib assembly 93a has a boss 95 formed on its end face.

With the use of the structures shown in FIGS. 16 and 17, a contacting area between the end face (serving to restrict the insertion movement of a boss portion) of a cross rib assembly and a reinforcing member, may be reduced so as to reduce a resistance against the movement of a resin window panel which is caused by a thermal expansion.

Although the above description has been given in relation to a sunroof for use in a motor vehicle, the structures according to the present invention may also be used in a rear quarter window or a rear window in an automobile vehicle.

What is claimed is:

1. A window device for use in a motor vehicle, comprising:

a reinforcing member having at least one engaging hole;

a resin window panel having a panel body, wherein at least one protruded engaging portion is formed on an inner surface of the panel body, the protruded engaging portion being adapted to be freely inserted into a corresponding engaging hole of the reinforcing member, and an insertion amount restricting portion is formed around the protruded engaging portion between the panel body and the reinforcing member, the insertion amount restricting portion being adapted to engage the reinforcing member so that a space having a predetermined height is formed between the panel body and the reinforcing member; and an engaging head comprising caulking disposed on an end of the protruded engaging portion after the protruded engaging portion is inserted in the corresponding engaging hole of the reinforcing member, said engaging head being engaged with an edge of the engaging hole through a metal piece.

2. The window device according to claim 1, wherein the insertion amount restricting portion is formed by a cross rib assembly.

3. The window device according to claim 2, wherein the protruded engaging portion is formed on a center of the cross rib assembly.

4. The window device according to claim 1, wherein the insertion amount restricting portion is formed by a star-shaped rib assembly.

5. The window device according to claim 4, wherein the protruded engaging portion is formed on a center of the star-shaped rib assembly.

6. The window device according to claim 1, wherein the protruded engaging portion is formed by a hollow cylindrical member.

7. The window device according to claim 1, wherein the metal piece has a cylindrical portion adapted to be freely inserted into an engaging hole of the reinforcing member for engaging with an end face of the insertion amount restricting portion.

8. The window device according to claim 1 wherein the protruded engaging portion is formed on the insertion amount restriction portion.

* * * * *